US012627122B2

(12) United States Patent
    Kang et al.

(10) Patent No.: US 12,627,122 B2
(45) Date of Patent: May 12, 2026

(54) SWITCHBOARD PROVIDED WITH COOLING UNIT

(71) Applicant: LS ELECTRIC CO., LTD., Anyang-si (KR)

(72) Inventors: Han Young Kang, Anyang-si (KR); Bong Jun Song, Anyang-si (KR); Yo Hwan Kim, Anyang-si (KR); Seog Won Lee, Anyang-si (KR)

(73) Assignee: LS ELECTRIC CO., LTD., Anyang-si (KR)

( * ) Notice: Subject to any disclaimer, the term of this patent is extended or adjusted under 35 U.S.C. 154(b) by 210 days.

(21) Appl. No.: 18/287,321

(22) PCT Filed: Nov. 25, 2021

(86) PCT No.: PCT/KR2021/017492
§ 371 (c)(1),
(2) Date: Oct. 18, 2023

(87) PCT Pub. No.: WO2022/225126
PCT Pub. Date: Oct. 27, 2022

(65) Prior Publication Data
US 2024/0195156 A1    Jun. 13, 2024

(30) Foreign Application Priority Data
Apr. 21, 2021    (KR) ........................ 10-2021-0051686

(51) Int. Cl.
H02B 1/56        (2006.01)
H02B 1/30        (2006.01)

(52) U.S. Cl.
CPC ............. H02B 1/565 (2013.01); H02B 1/306 (2013.01)

(58) Field of Classification Search
CPC ................................ H02B 1/306; H02B 1/565
See application file for complete search history.

(56) References Cited

U.S. PATENT DOCUMENTS 6,186,889 B1 *    2/2001    Byrne ................ H05K 7/20172
                                                        361/695
6,494,779 B1    12/2002    Nicolai et al.
(Continued)

FOREIGN PATENT DOCUMENTS

JP            2001177281 A        6/2001
KR      1020010097393 A      11/2001
(Continued)

OTHER PUBLICATIONS

International Search Report for related International Application No. PCT/KR2021/017492; action dated Oct. 27, 2022; (2 pages).

*Primary Examiner* — Robert J Hoffberg
(74) *Attorney, Agent, or Firm* — K&L Gates LLP

(57) ABSTRACT

A switchboard having a cooling unit is provided. The switchboard having the cooling unit according to an embodiment of the present disclosure may include a housing having an inner space, an air inlet formed at one side thereof, and an air outlet formed at the other side thereof; a heat source disposed at one side of the inner space; a cooling unit for introducing an external air through the air inlet to the inside of the housing and discharging an air of the inner space through the air outlet to the outside of the housing; and a support plate disposed in the inner space and coupled to the cooling unit to allow the cooling unit to enter and exit the inner space.

9 Claims, 12 Drawing Sheets

(56)          References Cited

U.S. PATENT DOCUMENTS

| | | | |
|---|---|---|---|
| 9,343,881 B2 * | 5/2016 | Hyrenbach | H02B 13/045 |
| 10,277,015 B2 * | 4/2019 | Choi | H02B 1/38 |
| 10,714,275 B2 * | 7/2020 | Geist | H02B 1/06 |
| 2013/0058781 A1 * | 3/2013 | Fu | H05K 7/20581 |
| | | | 415/220 |
| 2014/0160636 A1 | 6/2014 | Rajvanshi et al. | |

FOREIGN PATENT DOCUMENTS

| | | | | |
|---|---|---|---|---|
| KR | 101194385 B1 * | 10/2012 | | H02B 11/133 |
| KR | 101586022 B1 * | 1/2016 | | H02B 1/36 |
| KR | 102018007331 A | 7/2018 | | |
| KR | 102019107539 A | 9/2019 | | |

* cited by examiner (a)

(b)

(a)

(b)

SWITCHBOARD PROVIDED WITH COOLING UNIT

CROSS-REFERENCE TO RELATED APPLICATIONS

The present application is a National Stage of International Application No. PCT/KR2021/017492 filed on Nov. 25, 2021, which claims priority to and the benefit of Korean Utility Model Application No. 10-2021-0051686, filed Apr. 21, 2021, the disclosures of which are incorporated herein by reference in its entirety.

FIELD

The present disclosure relates to a switchboard having a cooling unit.

BACKGROUND

The switchboard mainly plays a role in receiving high-voltage power supplied by power producers in large facilities such as buildings and factories, converting it into voltage usable in the facility, and distributing it to distributing board installed in a distributed manner through main lines.

To this end, various electric devices such as breakers and current transformers are accommodated and used in switchboards for operation or control of a power plants and substations, and for operation of electric motors. At this time, the electric devices used in the switchboard may inevitably generate heat during operation.

Particularly, recently, as the large capacity and density of the switchboard progresses, the amount of heat generated by the electric devices disposed in the switchboard is getting higher.

Accordingly, a fan is used to control the flow so that external air is sucked in inside the switchboard to cool the heat source area inside the switchboard and then discharged.

However, when a filter is used, foreign substances accumulate in the filter over time, and the differential pressure increases, so that an appropriate flow rate is not generated. Therefore, the filter need to be replaced or cleaned.

In this case, the conventional switchboard does not separately divide the power supplied to the switchboard and the power supplied to the cooling unit, so that there is an inconvenience that maintenance work for the cooling configuration should be performed while the operation of the switchboard is stopped by blocking the power to the cooling unit.

Accordingly, there is a need for a switchboard capable of easily separating the cooling unit from the switchboard and performing maintenance even when the switchboard is in operation.

Meanwhile, in the case of the conventional switchboard, the power supplied to the switchboard and the power supplied to the cooling unit are common, and even when the temperature inside the switchboard is not high, the cooling unit is continuously used, thereby reducing the durability of the cooling unit.

SUMMARY

An object of the present disclosure is to provide a switchboard having a cooling unit capable of separating and maintaining the cooling unit even when the switchboard is in operation.

Another object of the present disclosure is to provide a switchboard having a cooling unit in which a user can easily separate the cooling unit from the switchboard.

In addition, an object of the present disclosure is to provide a switchboard having a cooling unit in which a user can easily check the extent to which the cooling unit is separated from the switchboard.

Another object of the present disclosure is to provide a switchboard having a cooling unit capable of operating the cooling unit depending on a temperature of the switchboard.

The objects of the present disclosure are not limited to the tasks mentioned above, and other tasks not mentioned will be clearly understood by those skilled in the art from the description below.

To solve the above problems, a switchboard having a cooling unit according to one aspect of the present disclosure may include: a housing having an inner space, an air inlet formed at one side thereof, and an air outlet formed at the other side thereof; a heat source disposed at one side of the inner space: a cooling unit for introducing an external air through the air inlet to the inside of the housing and discharging an air of the inner space through the air outlet to the outside of the housing; and a support plate disposed in the inner space and coupled to the cooling unit to allow the cooling unit to enter and exit the inner space.

In this case, the cooling unit may include: a case having a bottom unit and a front wall formed at a front side of the bottom unit: a handle formed at a front side of the front wall: a cooling fan disposed at one side of an upper surface of the bottom unit so as to form air flow in the inner space, wherein the switchboard further including: a coupling unit for guiding the bottom unit to slide forward and backward on an upper surface of the support plate.

In this case, the coupling unit may include at least one slider fixed to a lower surface of the bottom unit of the case; and at least one guide disposed on an upper surface of the support plate and including a lift limiting unit for guiding the slider forward and backward and restricting an rising of the slider.

In this case, coupling unit may further include: a stopper formed at a rear side of the guide so as to prevent the slider from deviating backward.

In this case, the switchboard may further include: a movement adjusting unit for adjusting a sliding motion of the bottom unit, wherein the movement adjusting unit may include a first bracket disposed at one side of the front wall of the bottom unit; a rotating shaft coupled to the first bracket so as to be rotatably disposed as forward and backward and having a screw thread formed on an outer circumferential surface thereof; and a screw rack disposed on an upper surface of the support plate so as to couple to a lower side of the screw thread, wherein an opening is formed through the bottom unit of the rotating shaft, and one side of the screw thread of the rotating shaft protrudes below the bottom unit through the opening and is coupled to the screw rack.

In this case, the movement adjusting unit may further include: a handle detachably coupled to the front side to rotate the rotating shaft.

In this case, the switchboard may further include: a state displaying unit for displaying a position of the bottom unit, wherein the state displaying unit comprises: a first gear disposed at a front side of the rotating shaft: a second bracket disposed at a front side of the first bracket; and a second gear coupled to the second bracket so as to engage with the first gear and rotate, wherein in a front side of the second gear, the first region disposed on an upper side in a state in which the bottom unit is disposed inside the housing and a second region disposed in an upper side in a state in which the bottom unit protrudes forward by the screw thread are provided.

In this case, the front wall of the case may include: a transparent unit for checking the first region or the second region through the front wall.

In this case, the cooling unit may further include: a temperature sensor fixed to the bottom unit so as to be disposed near the heat source; and a controller for controlling an output of the cooling fan depending on a temperature measured by the temperature sensor.

In this case, the controller may operate the cooling fan in a low output mode when a temperature measured by the temperature sensor is higher than or equal to a first temperature and less than a second temperature, operate the cooling fan in a medium output mode when a temperature measured by the temperature sensor is higher than or equal to the second temperature and less than a third temperature, and operate the cooling fan in a maximum output mode when a temperature measured by the temperature sensor is higher than or equal to the third temperature.

In this case, the first temperature, the second temperature, and the third temperature may be 70 degrees Celsius, 80 degrees Celsius and 100 degrees Celsius, respectively, wherein in the low output mode, the controller operates the cooling fan at 60% of the maximum output, in the medium output mode, the controller operates the cooling fan at 80% of the maximum output, and in the maximum output mode, the controller operates the cooling fan at the maximum output.

In this case, the heat source may be a power breaker.

The switchboard having the cooling unit according to an embodiment of the present disclosure may separate and maintain the cooling unit even in a state in which the switchboard is operated.

In addition, the switchboard having the cooling unit according to an embodiment of the present disclosure may allow a user to easily separate the cooling unit from the switchboard.

In addition, the switchboard having the cooling unit according to an embodiment of the present disclosure may allow the user to easily check the extent to which the cooling unit is separated from the switchboard.

In addition, the switchboard having the cooling unit according to an embodiment of the present disclosure may allow the cooling unit to be operated depending on the temperature of the switchboard.

It should be understood that the effects of the present disclosure are not limited to the above-described effects, and include all effects that can be inferred from the construction of the disclosure described in the description or the claims.

Figure 6:
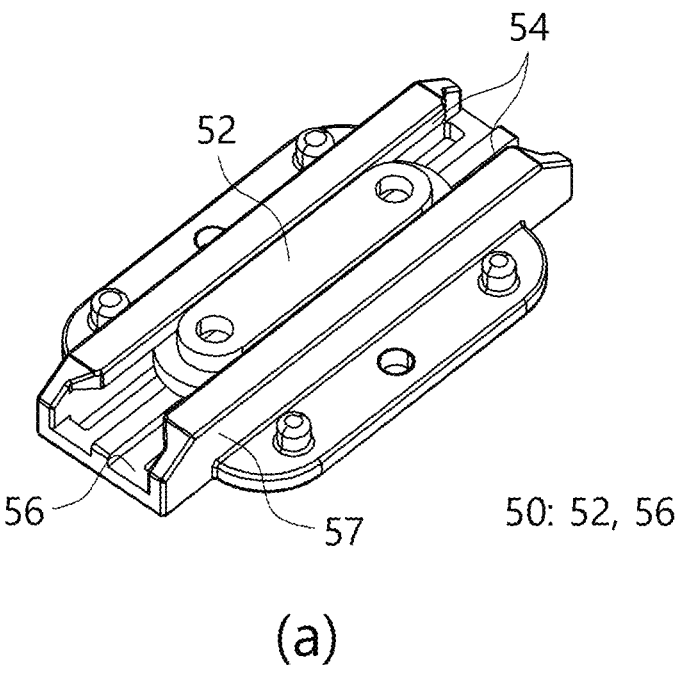
Figure 6:
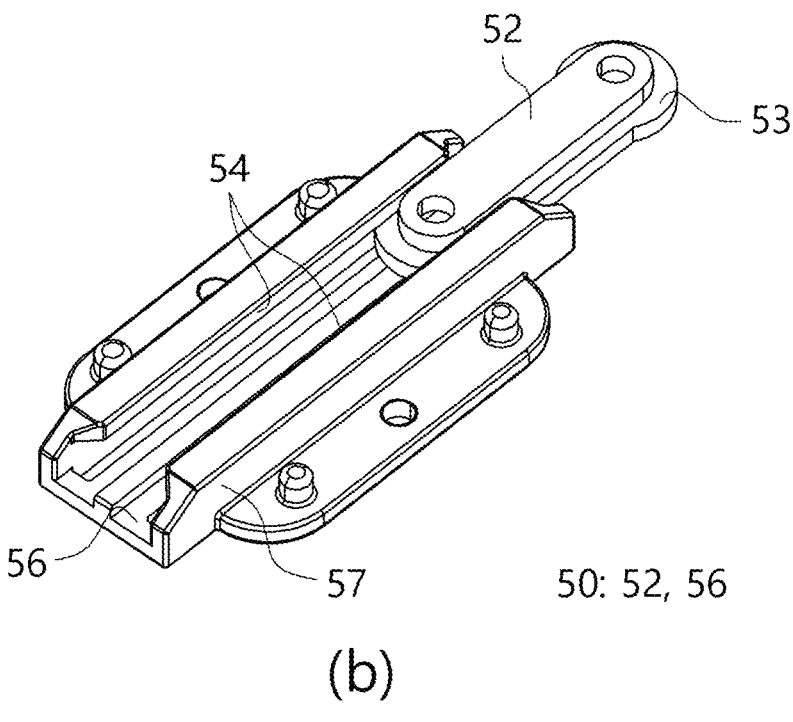

(a) of FIG. 6 is a view showing an engaged state of a coupling unit of the switchboard having a cooling unit according to an embodiment of the present disclosure, and (b) of FIG. 6 is a view showing a disengaged state of a coupling unit of a switchboard having a cooling unit according to an embodiment of the present disclosure.

Figure 7:
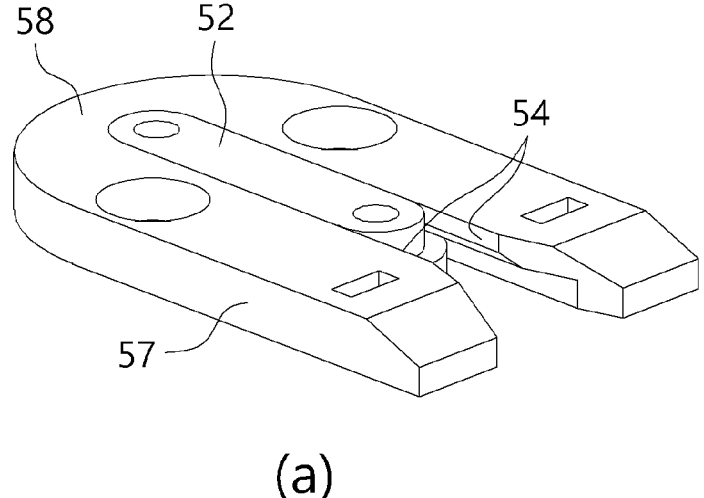
Figure 7:
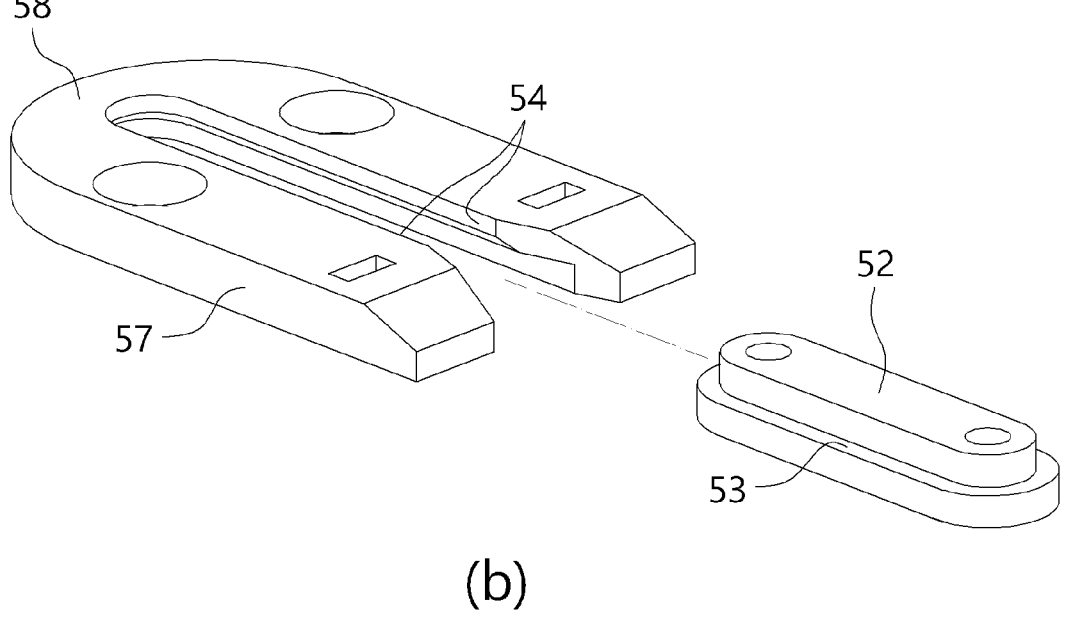

(a) of FIG. 7 is a view showing an engaged state of a coupling unit including a stopper of a switchboard having a cooling unit according to an embodiment of the present disclosure, and (b) of FIG. 7 is a view showing a disengaged state of a coupling unit including a stopper of a switchboard having a cooling unit according to an embodiment of the present disclosure.

Figure 8:
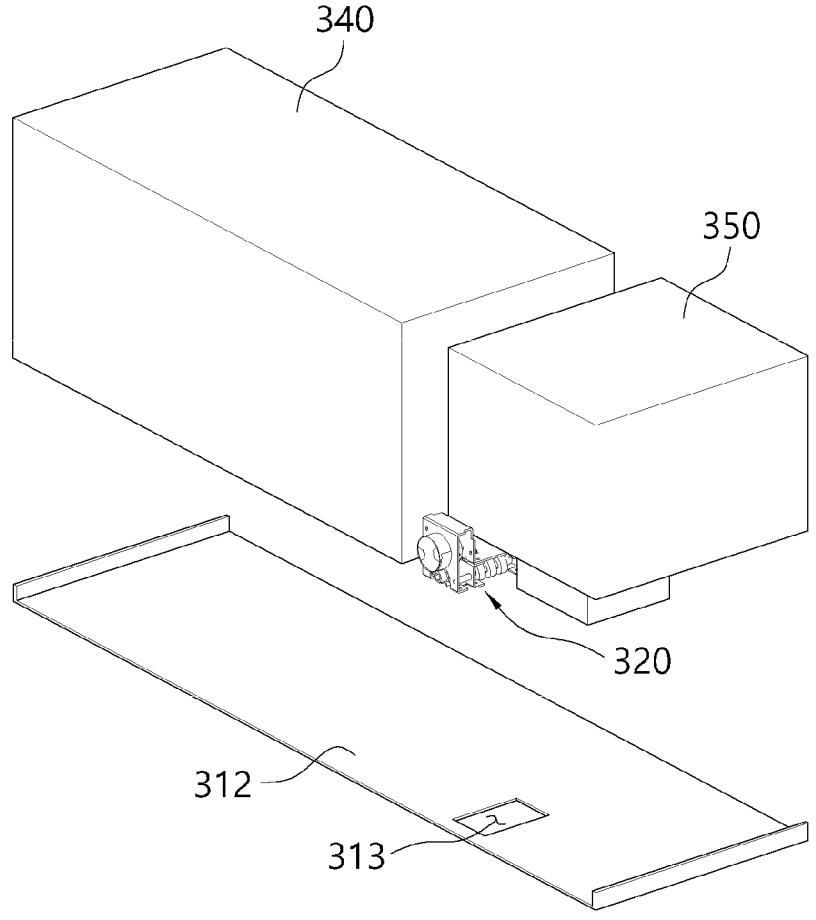

FIG. 8 is an exploded perspective view of a cooling unit of a switchboard having a cooling unit according to an embodiment of the present disclosure.

Figure 9:
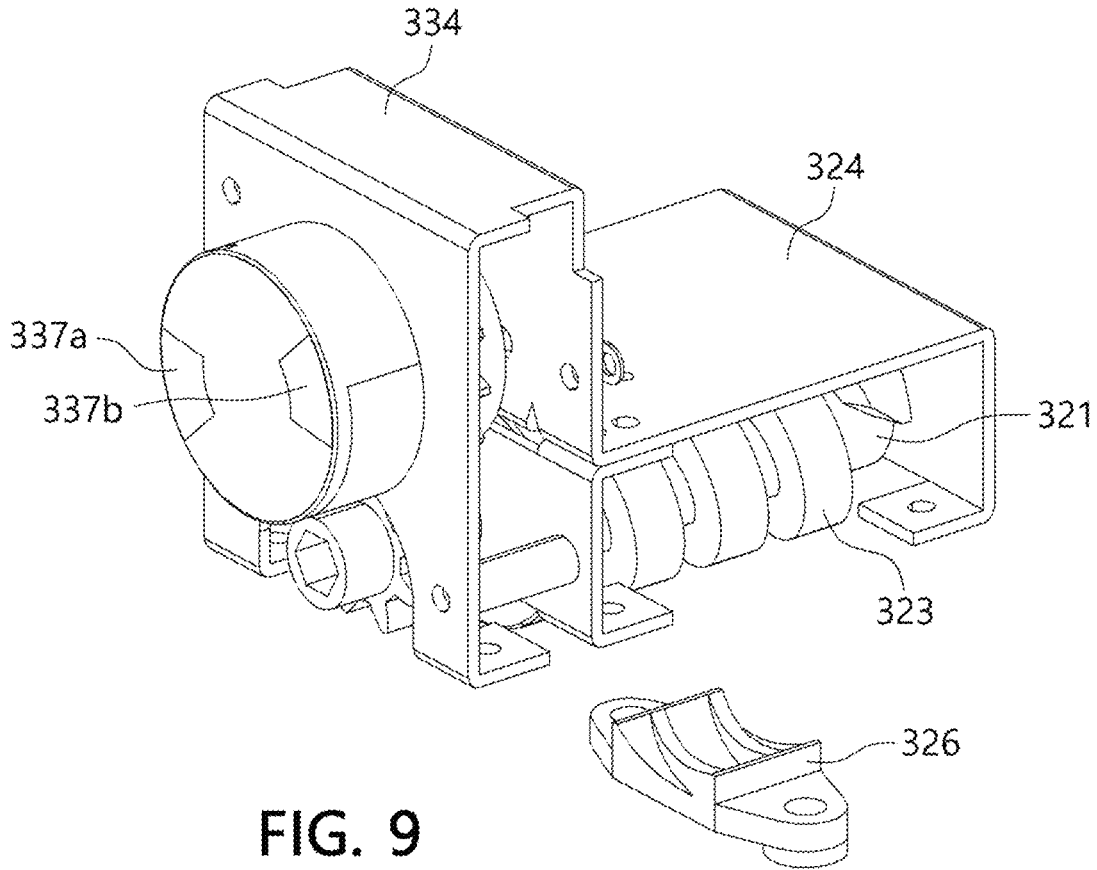

FIG. 9 is a view showing a movement adjusting unit and a state displaying unit of a cooling unit of a switchboard having a cooling unit according to an embodiment of the present disclosure.

Figure 10:
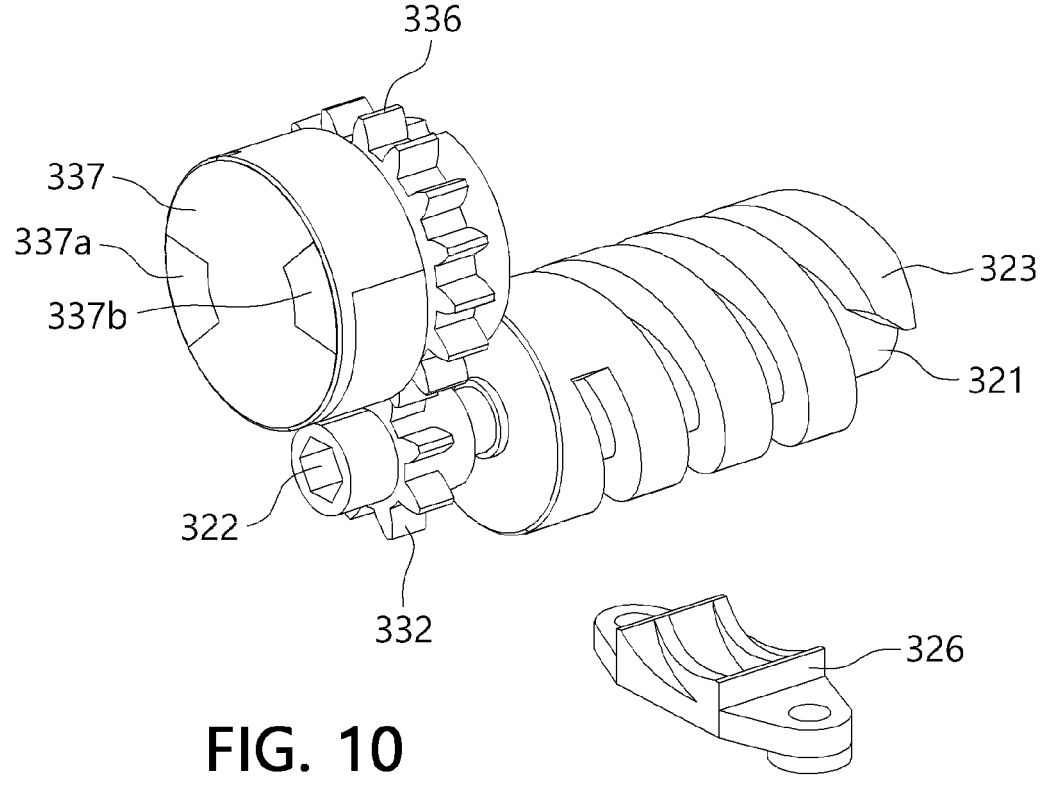

FIG. 10 is a view showing a state in which a first bracket and a second bracket of a movement adjusting unit and a state displaying unit of a switchboard having a cooling unit according to an embodiment of the present disclosure are removed.

Figure 11:
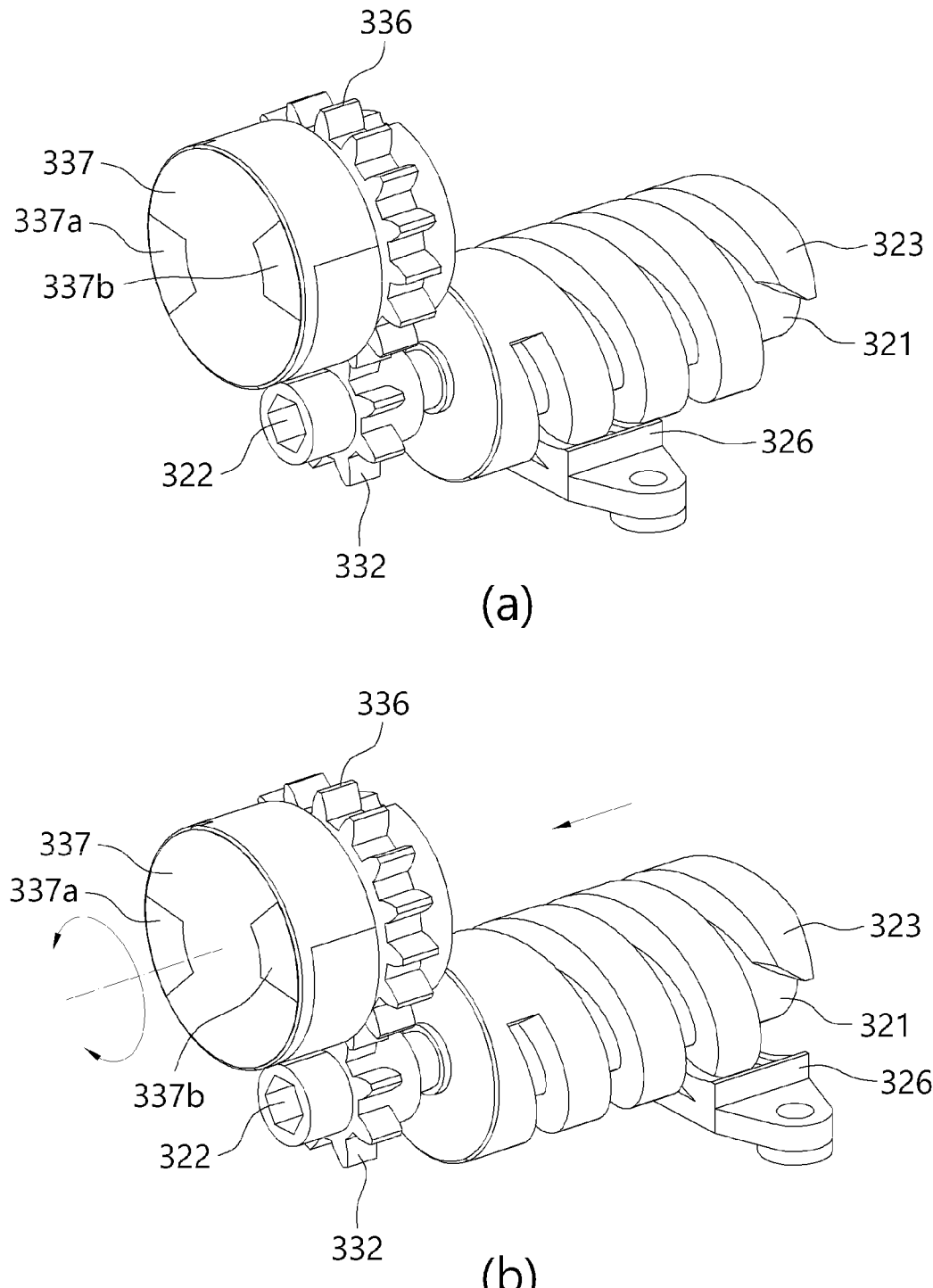

(a) of FIG. 11 is a view showing a locked state of a movement adjusting unit of a switchboard having a cooling unit according to an embodiment of the present disclosure, and (b) of FIG. 11 is a view showing a unlocked state of a movement adjusting unit of a switchboard having a cooling unit according to an embodiment of the present disclosure.

Figure 12:
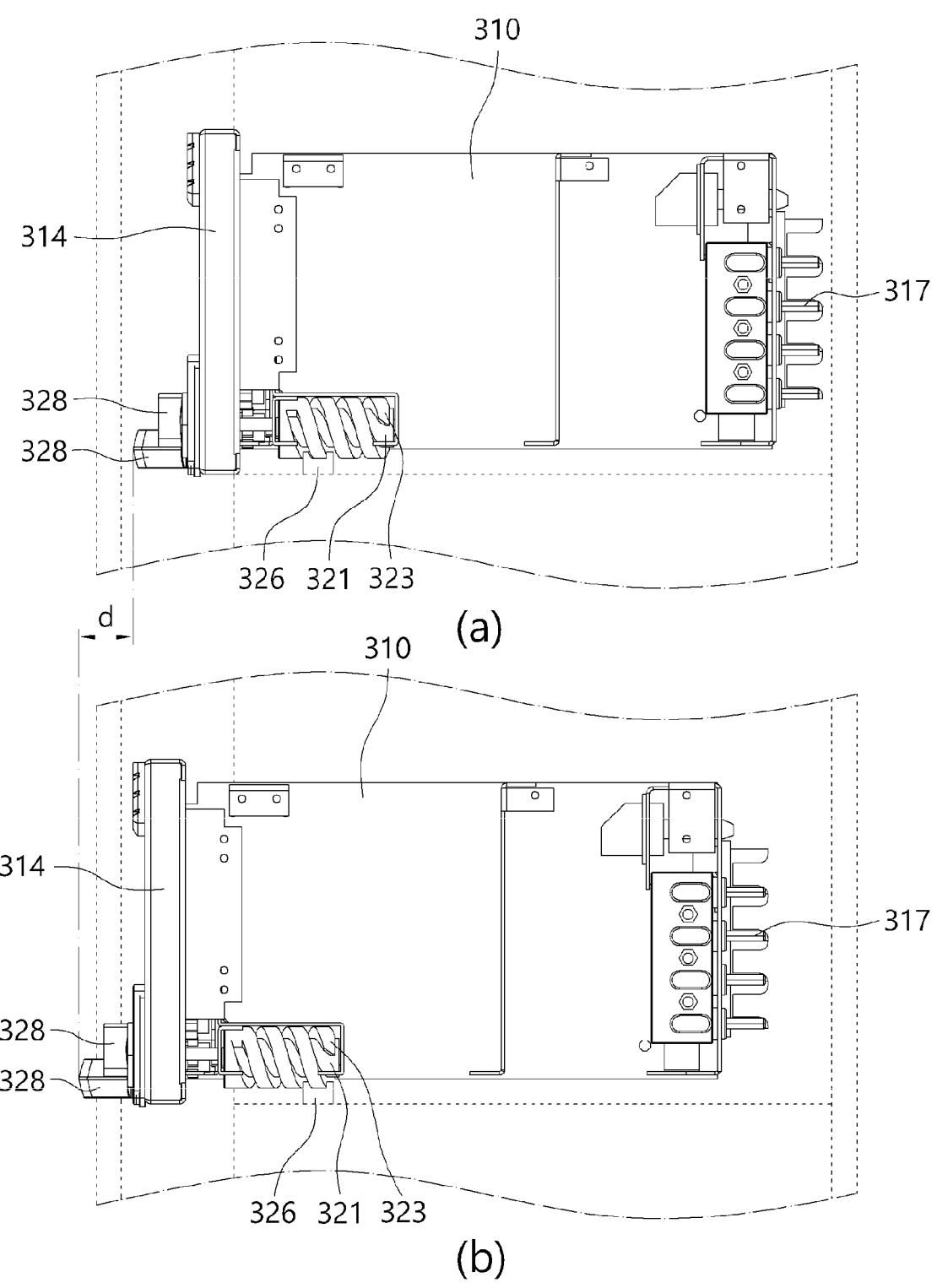

(a) of FIG. 12 is a cross-sectional view showing a locked state of a movement adjusting unit of a switchboard having a cooling unit according to an embodiment of the present disclosure, and (b) of FIG. 12 is a cross-sectional view showing a unlocked state of a movement adjusting unit of a switchboard having a cooling unit according to an embodiment of the present disclosure.

DETAILED DESCRIPTION

Hereinafter, embodiments of the present disclosure will be described in detail with reference to the accompanying drawings so that those skilled in the art can easily carry out the present disclosure. The present disclosure may be embodied in various different forms and is not limited to the embodiments described herein. In the drawings, parts not related to the description are omitted to clearly describe the present disclosure, and the same or similar components are denoted by the same reference numerals throughout the specification.

Hereinafter, a direction toward an upper portion of the switchboard shown in the drawings is defined as an upper direction and a direction toward a lower portion of the switchboard is defined as a lower direction, and a side where the front cover of the switchboard is disposed is defined as a front direction of the switchboard. A direction toward an inside of the electronic device are defined as a rear direction of the electronic device. In the drawings, a thickness or a size is exaggerated to clearly represent features of a configuration, and the thickness or the size of the configuration shown in the drawings is not represented as being substantially the same.

The present disclosure relates to a cooling unit for cooling a heat source emitting heat as a component for operation of a switchboard and provides a switchboard capable of separating and repairing only the cooling unit even when the switchboard is in operation when the cooling unit malfunctions.

Figure 1:
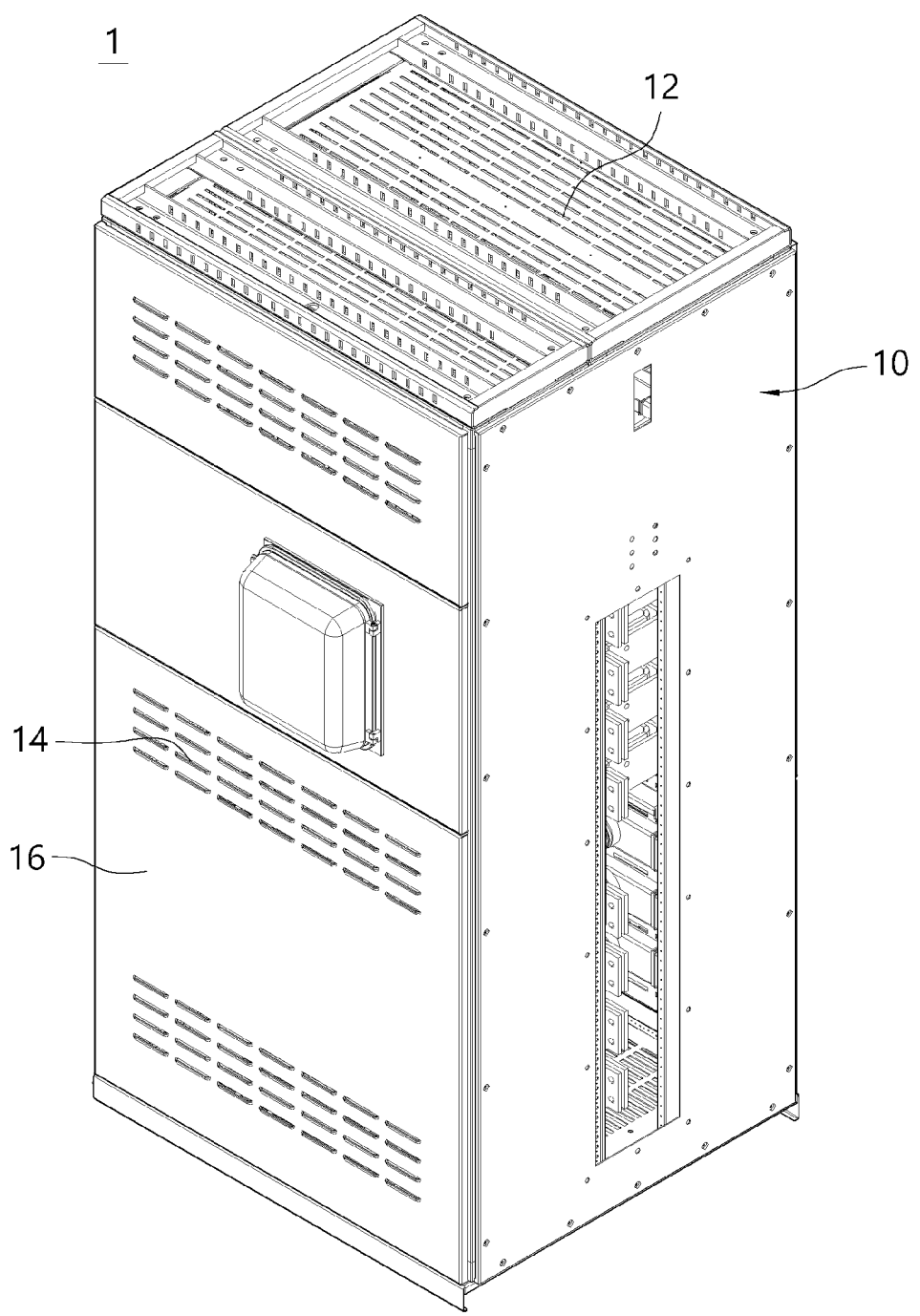
FIG. 1 is a perspective view of a switchboard having a cooling unit according to an embodiment of the present disclosure.
Figure 2:
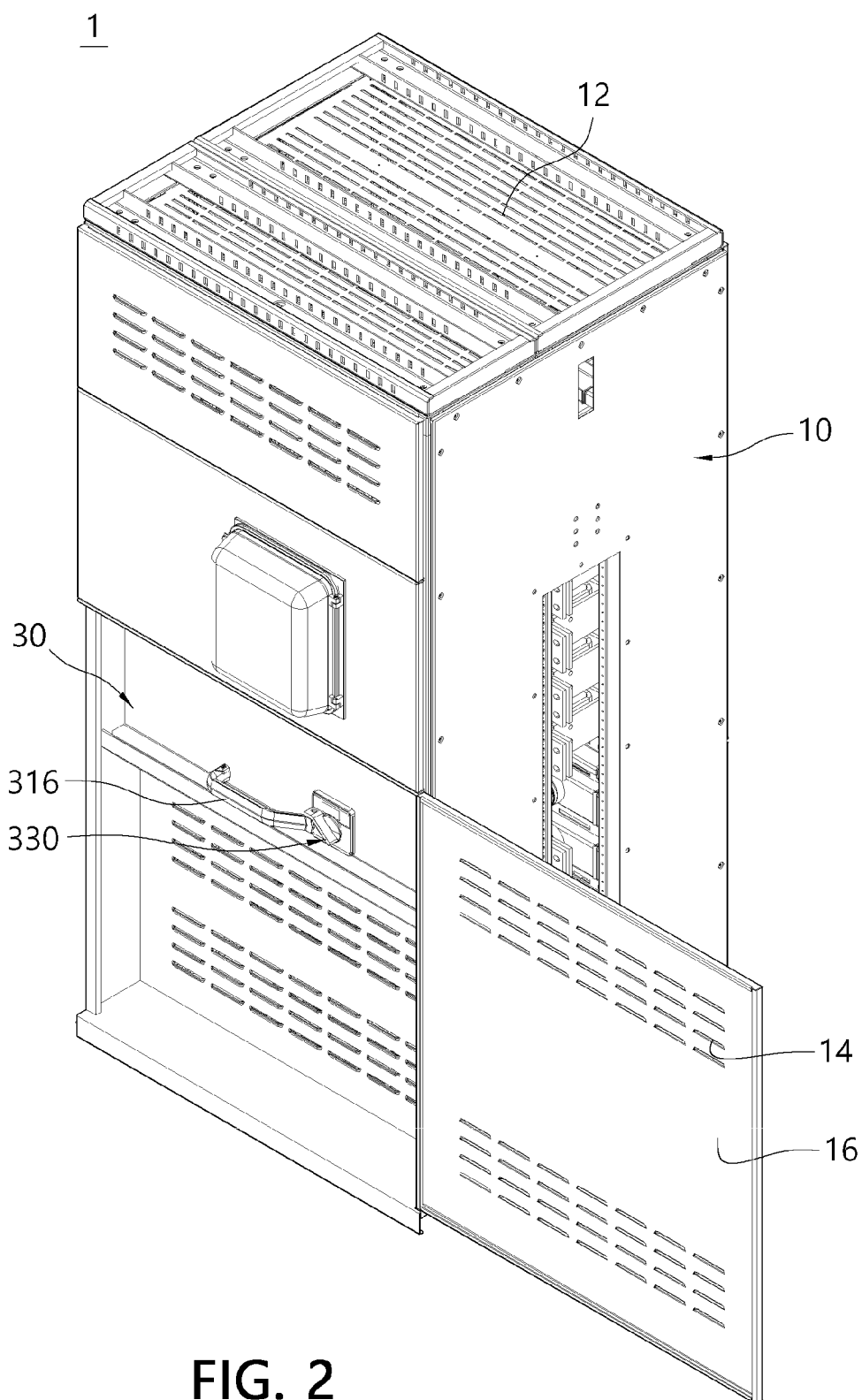
FIG. 2 is a perspective view of a state in which a front cover of a switchboard having a cooling unit according to an embodiment of the present disclosure is opened.

FIG. 1 is a perspective view of a switchboard having a cooling unit according to an embodiment of the present disclosure. FIG. 2 is a perspective view of a state in which a front cover of a switchboard having a cooling unit according to an embodiment of the present disclosure is opened.

Referring to FIG. 1, the switchboard 1 including a cooling unit according to an embodiment of the present disclosure includes a housing 10, a heat source (not shown), a cooling unit 30, a support plate 40, and a coupling unit 50.

As shown in FIG. 1, a space is formed in the housing 10. In this case, an electronic device for operating the switchboard, for example, a circuit breaker or a current transformer, may be disposed in an inner space of the housing 10.

In this case, the electronic device for operating the switchboard 1 emits heat to the inner space of the housing 10 while the switchboard 1 is operated, and increases a temperature of the inner space of the housing 10. Hereinafter, an electronic device disposed in an inner space of the housing 10 to increase a temperature of the inner space according to the operation of the switchboard 1 is defined as a heat source (not shown).

In order to lower a temperature of the inner space of the housing 10 where the temperature is increased due to an operation of the switchboard 1, an air inlet 14 is formed on one side of the housing 10 to allow external cold air to flow therein.

At this time, the air inlet 14 is not limited in shape or position as long as it is formed to allow fluid communication between the outside and the inner space of the housing 10. For example, as shown in FIG. 1, the air inlet 14 may be formed in a form in which a plurality of holes are disposed on one side of the housing 10.

The air introducing into the inner space of the housing 10 through the air inlet 14 absorbs heat from the heat source (not shown), and the inner space is cooled accordingly.

In this case, an air outlet 12 is formed on the other side of the housing 10 so that the air absorbing heat from the heat source (not shown) can flow out again.

The air outlet 12, like the air inlet 14, is not limited in its shape or position. However, in the case of the air outlet 12, as shown in FIG. 1, it may be formed on the upper surface of the housing 10 so that air at a higher temperature can be more easily discharged to the outside through convection phenomenon.

In this case, as shown in FIG. 2, a cooling unit 30 for forming a flow of air is disposed in the housing 10 so as to easily introduce external air from the air inlet 14 into the inner space and discharge the air absorbing heat from the inner space to the outside through the air outlet 12.

At this time, the cooling unit 30 is formed to be detachable from the housing 10, and when the cooling unit 30 is coupled to the inside of the housing 10, the inner space of the housing 10 is protected by dividing the outer space and the inner space of the housing 10 such that the state in which the cooling unit 30 is disposed in the inner space of the housing 10 cannot be seen from the outside through the front cover 16 as shown in FIG. 2.

At this time, the front cover 16 is formed in a structure that may be opened to separate the cooling unit 30, as shown in FIG. 2.

Figure 3:
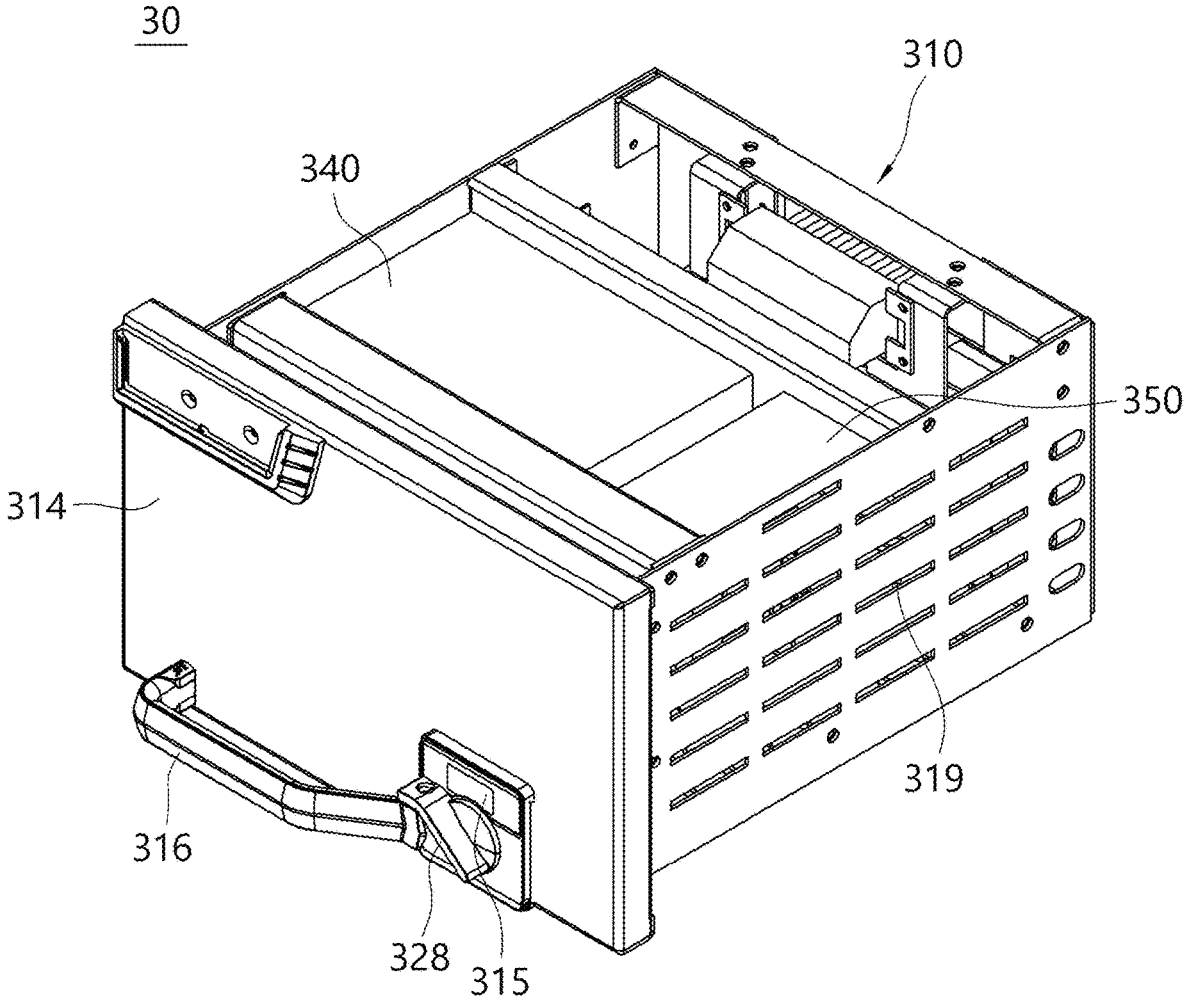
FIG. 3 is a perspective view of a cooling unit of a switchboard having a cooling unit according to an embodiment of the present disclosure, viewed from one direction.

FIG. 3 is a perspective view of a cooling unit of a switchboard having a cooling unit according to an embodiment of the present disclosure, viewed from one direction.

Figure 4:
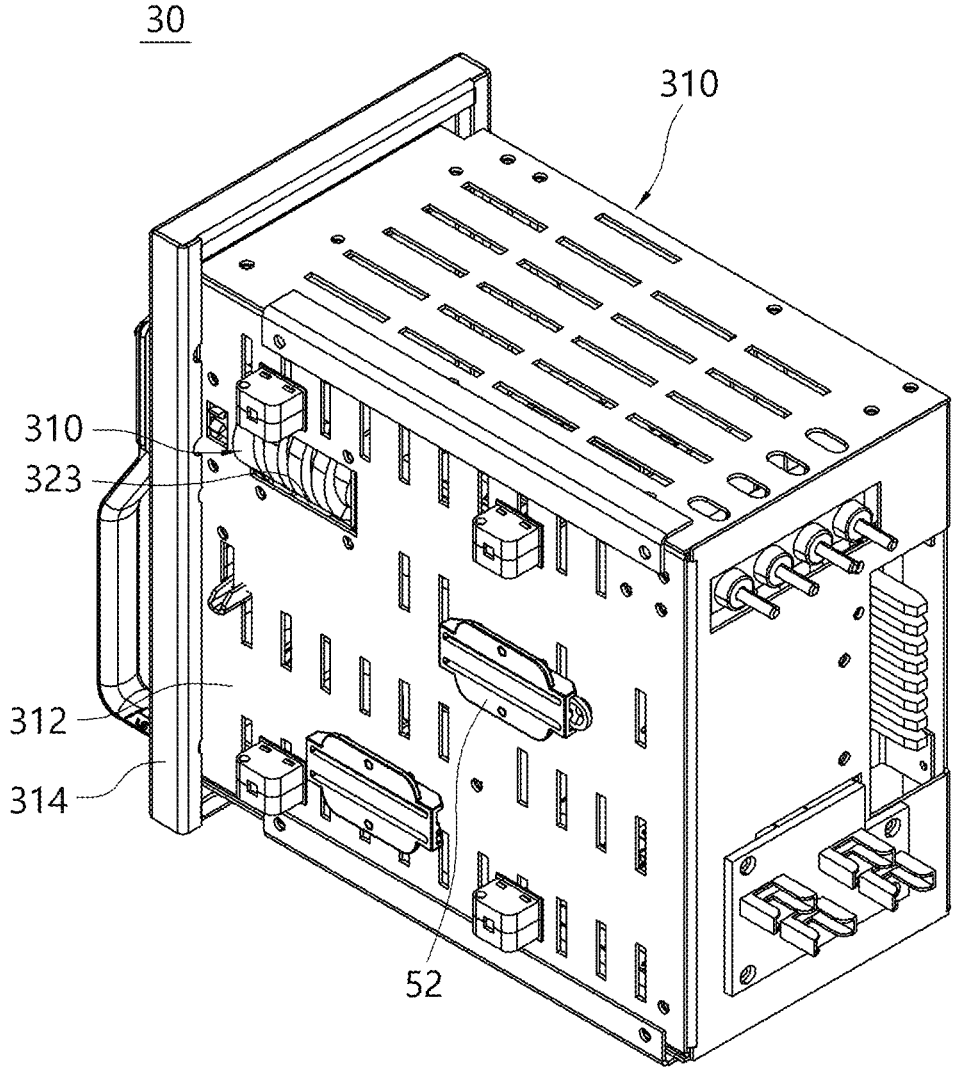
FIG. 4 is a perspective view of a cooling unit of a switchboard having a cooling unit according to an embodiment of the present disclosure, viewed from the other direction.
Figure 5:
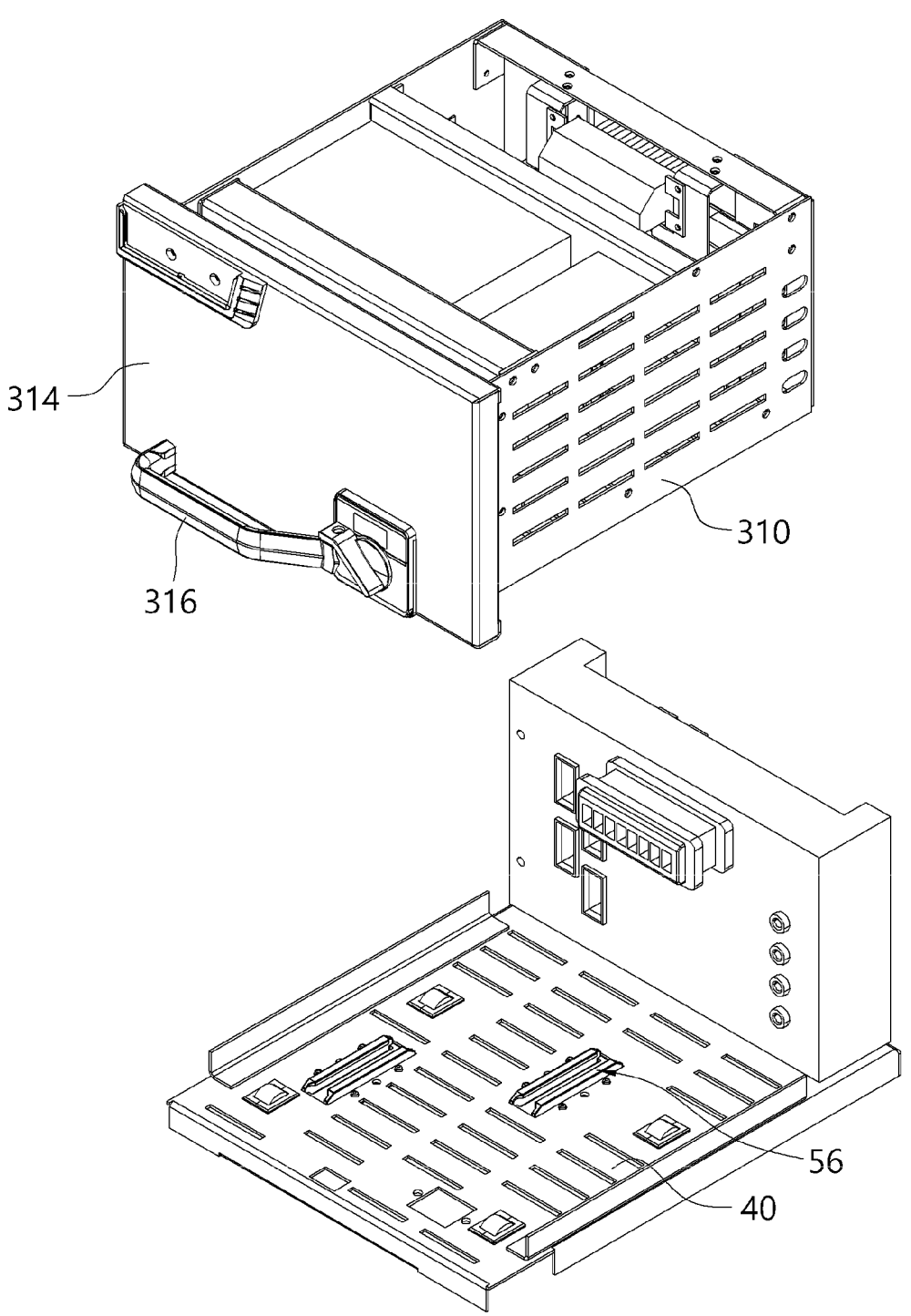
FIG. 5 is a perspective view showing a support plate of a switchboard having a cooling unit according to an embodiment of the present disclosure.

FIG. 4 is a perspective view of a cooling unit of a switchboard having a cooling unit according to an embodiment of the present disclosure, viewed from the other direction. FIG. 5 is a perspective view showing a support plate of a switchboard having a cooling unit according to an embodiment of the present disclosure.

The cooling unit 30 of the switchboard 1 including the cooling unit according to an embodiment of the present disclosure includes a case 310, a movement adjusting unit 320, a state displaying unit 330, a cooling fan 340, a temperature sensor 350, and a controller (not shown).

In this case, as shown in FIG. 3, the case 310 of the cooling unit 30 of the switchboard 1 including the cooling unit according to an embodiment of the present disclosure includes: a bottom unit 312 in which a cooling fan 340, a temperature sensor 350, and the controller (not shown) are disposed on an upper surface; and a front wall 314 disposed on a front side of the bottom unit 312.

As shown in FIG. 3, a handle 316 is disposed on the front surface of the front wall 314. The handle 316 is formed in a form that the user can grip to separate the cooling unit 30 to the outside while the user opens the front cover 16. For example, as shown in FIG. 3, a length-extended bar spaced apart from the front surface of the front wall 314 may be extended and fixed from both sides of the bar to the front surface of the front wall 314.

As illustrated in FIG. 3, a sidewall protruding upward may be formed in a circumferential portion of the bottom unit 312. As shown in FIG. 3, a plurality of air inflow holes 319 may be disposed on the sidewall. The air flow holes 319 provide a passage through which air introduced from the air inlet 14 of the housing 10 may move toward the cooling fan 340 disposed on the upper surface of the bottom unit 312.

In this case, as long as the cooling fan 340 can form air flow, various known components may be used. For example, a through hole may be formed in the upper side, and a fan disposed therein may rotate to create a flow of air.

An output of the cooling fan 340 is controlled by a controller (not shown). The controller (not shown) determines the output of the cooling fan 340 based on the temperature measured by the temperature sensor 350. In this case, the controller (not shown) may be formed as one module with the temperature sensor 350.

In this case, the temperature sensor 350 may be disposed adjacent to the heat source (not shown). Since the inner space of the housing 10 has the highest temperature near the heat source (not shown) as a thermal source, the temperature sensor 350 is disposed near the heat source (not shown), and thus a risk of a failure or fire due to high temperatures may be prevented more stably.

In more detail, when the controller (not shown) determines the output of the cooling fan 340, the controller (not shown) may operate the output of the cooling fan 340 at a low output, for example, 60% of the maximum output, when the temperature measured by the temperature sensor 350 is 70 to 80 degrees Celsius.

When the temperature measured by the temperature sensor 350 is 80 to 100 degrees Celsius, the output of the cooling fan 340 may be increased. For example, the cooling fan 340 may be operated at 80% of the maximum output. In addition, when the temperature measured by the temperature sensor 350 is 100 degrees Celsius or higher, the output of the cooling fan 340 is maximized, so that the temperature of the inner space of the high-temperature housing 10 can be rapidly lowered. However, the above-described temperature range may be further subdivided into steps or may vary the temperature range if the temperature is specified according to an embodiment of the present disclosure.

As described above, by gradually adjusting the output of the cooling fan 340 according to the temperature, when cooling is not urgently required, the output is lowered to prevent overload of the cooling fan 340, and thus durability may be increased and power consumption may be reduced.

Meanwhile, as illustrated in FIGS. 4 and 5, in a switchboard 1 including a cooling unit according to an embodiment of the present disclosure, a terminal 317 electrically connected to a power source inside the housing 10 for supplying power to the cooling unit 30 is formed to protrude rearwards from a rear surface of the case 310, and the case 310 is formed to slide forward and backward so that the terminal 317 is separated from the power source and then may be separated from the inside of the housing 10.

At this time, various known components may be used as a structure in which the terminal 317 is connected to the power source if the case 310 is moved forward to separate the terminal 317 from the power source.

In this case, the switchboard 1 including the cooling unit 30 according to an embodiment of the present disclosure may further include a support plate 40 for supporting the cooling unit 30 inside the housing 10 so that the cooling unit 30 can slide forward and backward.

As shown in FIG. 5, the support plate 40 is disposed in the inner space of the housing 10, but there is no limitation on the position of the support plate 40. For example, the support plate 40 may be arranged side by side on the inner surface of the housing 10, or may be disposed to partition the inner space of the housing 10 as illustrated in FIG. 5. However, for convenience of description, the description will be given by defining the case as illustrated in FIG. 5.

Meanwhile, in the switchboard 1 including the cooling unit according to the embodiment of the present disclosure, the coupling unit 50 may be provided between the support plate 40 and the bottom unit 312 of the cooling unit 30 so that the cooling unit 30 may slide on the support plate 40.

The coupling unit 50 may include a slider 52 disposed on a lower surface of the bottom unit 312, as illustrated in FIG. 4, and a guide 56 disposed on an upper surface of the support plate 40, as illustrated in FIG. 5.

(a) of FIG. 6 is a view showing an engaged state of a coupling unit of the switchboard having a cooling unit according to an embodiment of the present disclosure, and (b) of FIG. 6 is a view showing a disengaged state of a coupling unit of a switchboard having a cooling unit according to an embodiment of the present disclosure.

(a) of FIG. 7 is a view showing an engagement state of a coupling unit including a stopper of a switchboard having a cooling unit according to an embodiment of the present disclosure, and (b) of FIG. 7 is a view showing a disengagement state of a coupling unit including a stopper of a switchboard having a cooling unit according to an embodiment of the present disclosure.

As shown in (a) of FIG. 6, The guide 56 includes a pair of guide walls 57 spaced apart from each other at a predetermined interval and extending rearward. A slider 52 extending shorter than the extension length of the guide wall

57 is arranged side by side between the pair of guide walls 57, and the slider 52 slides in a longitudinal direction of the guide wall 57 between the guide walls 57.

In this case, as shown in (b) of FIG. 6, a protrusion 53 protruding radially from an outer circumferential surface of the end is formed on an end portion of a lower side of the slider 52, and a lift limiting unit 54 in which a pair of guide walls 57 protruding in a direction of each other is formed on an end portion of an upper side of the guide walls 57.

Accordingly, as shown in (b) of FIG. 6, the slider 52 can be disposed between the pair of guide walls 57 by sliding in a longitudinal direction at an end portion of the pair of guide walls 57, and an upper surface of the protrusion 53 is in contact with a lower surface of the lift limiting unit 54 to restrict the slider 52 from deviating in a direction other than the longitudinal direction.

In this case, as shown in (a) of FIG. 7, a stopper 58 for preventing the slider 52 from deviating backward may be formed at the rear end portion of the pair of guide walls 57.

The stopper 58 may be formed by connecting the rear end portions of the pair of guide walls 57 to each other. As shown in (b) of FIG. 7, accordingly, even when the slider 52 slides between the pair of guide walls 57, the slider 52 may be separated only to the front side, and when the slider 52 comes in contact with the rear stopper 58, the slider 52 may be prevented from being sliding any more.

FIG. 8 is an exploded perspective view of a cooling unit of a switchboard having a cooling unit according to an embodiment of the present disclosure. FIG. 9 is a view showing a movement adjusting unit and a state displaying unit of a cooling unit of a switchboard having a cooling unit according to an embodiment of the present disclosure. FIG. 10 is a view showing a state in which a first bracket and a second bracket of a movement adjusting unit and a state displaying unit of a switchboard having a cooling unit according to an embodiment of the present disclosure are removed, (a) of FIG. 11 is a diagram showing a locked state of a movement adjusting unit of a switchboard having a cooling unit according to an embodiment of the present disclosure, and (b) of FIG. 11 is a view showing a unlocked state of a movement adjusting unit of a switchboard having a cooling unit according to an embodiment of the present disclosure. (a) of FIG. 12 is a cross-sectional view showing a locked state of a movement adjusting unit of a switchboard having a cooling unit according to an embodiment of the present disclosure, and (b) of FIG. 12 is a cross-sectional view showing a unlocked state of a movement adjusting unit of a switchboard having a cooling unit according to an embodiment of the present disclosure.

The cooling unit 30 of the switchboard 1 including the cooling unit according to an embodiment of the present disclosure may further include a movement adjusting unit 320 and a state displaying unit 330.

As shown in FIG. 8, the movement adjusting part 320 is disposed at a front side of the bottom unit 312 so as to adjust the sliding of the bottom unit 312 of the case 310 on the upper surface of the support plate 40.

In this case, the movement adjusting unit 320 of the switchboard 1 including the cooling unit according to an embodiment of the present disclosure includes a first bracket 324 disposed on one side of the front wall 314 of the bottom unit 312, a rotating shaft 321 fixed to the first bracket 324 to rotate, a screw thread 323 formed on an outer circumferential surface of the rotating shaft 321, and a screw rack 326 coupled to the screw thread 323.

In this case, the rotating shaft 321 is formed to extend in length and is coupled to the first bracket 324 so that the longitudinal direction of the rotating shaft 321 is disposed in the front-rear direction as shown in FIG. 9.

The rotating shaft 321 may be rotated while being coupled to the first bracket 324. In this case, a groove 322 recessed to the rear side may be formed at the front end of the rotating shaft 321 as illustrated in FIG. 9.

The handle 328 may be detachably coupled to the groove 322, and the shape of the handle 328 is not limited as long as the shape can be gripped by the user. For example, a straight-shaped protrusion extending in a radial direction may be formed on the top of the disk. (see FIG. 3)

The groove 322 has a polygonal cross-section so that the rotating shaft 321 may be rotated together with the rotation of the handle 328 while the handle 328 is coupled to the groove 322. For example, as shown in FIG. 9, it may be formed in a rectangular cross-section.

The handle 328 is disposed on the front face of the front wall 314 through the front wall 314 while being coupled to the groove 322. Accordingly, the user may rotate the rotating shaft 321 by rotating the handle 328 disposed on the front surface of the front wall 314.

As shown in FIG. 10, a spiral screw thread 323 protrudes from an outer surface of the rotating shaft 321. In this case, an opening 313 penetrated into the bottom unit 312 of the screw thread 323 has an area equal to or greater than the area occupied by the screw thread 323. Accordingly, a portion of the lower side of the thread 323 is disposed to protrude below the bottom unit 312 through the opening 313.

At this time, a screw rack 326 into which a portion of the lower side of the screw rack 323 is inserted and coupled is disposed below the screw thread 323. The screw rack 326 is disposed such that two diagonally protruding side walls are spaced apart from each other by a length of a width of the screw thread 323 so that a portion of a lower side of the screw thread 323 can be inserted thereinto.

Accordingly, when the user turns the handle 328 while a portion of the lower side of the screw thread 323 is disposed between a pair of sidewalls of the screw rack 326, the screw thread 323 rotates and moves relative to the screw rack 326.

In more detail, as shown in (a) of FIG. 11, when the rotating shaft 321 is rotated clockwise or counterclockwise while a portion of the lower side of the screw thread 323 is coupled to the non-moving screw rack 326, the rotating shaft 321 moves forward or backward depending to the shape of the screw thread 323.

In this case, since the rotating shaft 321 is rotated while being coupled to the first bracket 324, when the rotating shaft 321 moves forward or backward, the case 310 to which the first bracket 324 is fixed moves forward or backward together.

At this time, in the case of (b) of FIG. 11, when the rotating shaft 321 is rotated counterclockwise, the rotating shaft moves forward, and the case 310 also moves forward.

Accordingly, the terminal 317 disposed at the rear of the case 310 may be separated from the power source. More specifically, as shown in (a) of FIG. 12, when the user rotates the handle 328 to move the case 310 forward while the case 310 is coupled to the housing 10, the case 310 protrudes forward by a length "d" in the longitudinal direction of the rotating shaft 321.

In this case, as shown in (b) of FIG. 12, when the case 310 protrudes forward, the rear side terminal 317 is spaced apart from the inner side surface of the housing 10, and although not shown in the figure, the terminal 317 may be sufficiently separated from the terminal disposed on an inner side surface of the housing 10.

Thus, the user may easily disengage the firmly fitted terminal 317 from the power source by rotating the handle 328, and when the terminal 317 is disengaged from the power source, the user may easily disengage the case 310 from the housing 10 by pulling the handle 316. In this case, since the slider 52 for pulling the handle 316 slides while being coupled to the guide 56, the user may disengage or engage the case 310 in a single direction Meanwhile, as illustrated in FIG. 10, the rotating shaft 321 is connected to the state displaying unit 330 for displaying a rotation state of the rotating shaft 321, that is, a position of the bottom unit 312. The state displaying unit 330 of the switchboard 1 including the cooling unit according to an embodiment of the present disclosure includes a first gear 332 disposed at a front side end of the rotating shaft 321 and rotating together with the rotating shaft 321, a second gear 336 engaged with the first gear 332 and rotating, and a second bracket 334 supported by the second gear 336.

In this case, as illustrated in FIG. 10, one surface of the front side of the second gear 336 is disposed to pass through the second bracket 334. The second bracket 334 is disposed in front of the first bracket 324. In this case, the first bracket 324 and the second bracket 334 may be integrally formed.

A first area 337a is formed on a portion of a circumference of the front side of the second gear 336, and a second area 337b is formed on the other portion of the circumference.

The first area 337a and the second area 337b are not limited to the embodiment if the user is able to identify. For example, the first area 337a and the second area 337b may be displayed in different colors.

In this case, a transparent unit 315 is formed on the front wall 314 of the case 310 so that the display of the first region 337a or the second region 337b may be chicked through the front wall 314. The transparent unit 315 may be formed as a hole to be formed through the front wall 314, or may be formed to cover the hole using a transparent material.

The first area 337a is formed at a position where the user can chick the first area 337a through the transparent unit 315 when the screw rack 326 is disposed at the frontmost side of the screw thread 323. On the contrary, the second area 337b is formed at a position where the user can check the second area 337b through the transparent unit 315 when the screw rack 326 is disposed at the rearmost side of the screw thread 323.

Accordingly, the user may rotate the handle 328 while checking the position of the bottom unit 312 or whether the terminal 317 is separated from the power source through the transparent unit 315 and may move the case 310 from the housing 10.

Alternatively, on the contrary, when the case 310 is engaged to the inside of the housing 10, the handle 328 is rotated while checking the transparent portion 315 and may check whether the terminal 317 is sufficiently coupled to the power source.

As described above, the switchboard having the cooling unit according to an embodiment of the present disclosure may separate and maintain the cooling unit while the switchboard does not cut off the power source even during operation. In particular, the user may easily disengage or engage the case through the movement adjusting unit and the state display unit and easily recognize whether the case is sufficiently firmly engaged or sufficiently disengaged.

Although the switchboard having the cooling unit according to an embodiment of the present disclosure has been described above, it will be apparent to those skilled in the art that the coupling structure of the cooling unit of the switchboard having the cooling unit according to the present embodiment is not applicable to the switchboard, and may be used without limitation in equipment on which the cooling unit is mounted.

As described above, the preferred embodiments of the present disclosure are described, and it will be apparent to those skilled in the art that the present disclosure may be embodied in other specific forms without departing from the spirit and scope of the present disclosure, in addition to the above-described embodiments. Therefore, the above-described embodiments should be considered to be illustrative and not restrictive, and accordingly, the present disclosure is not limited to the above-described description and may be changed within the scope of the appended claims and the equivalents thereof.

What is claimed is:

1. A switchboard comprising:

a housing having an inner space, an air inlet formed at one side thereof, and an air outlet formed at another side thereof;

a heat source disposed at one side of the inner space;

a support plate disposed in the inner space;

a cooling unit configured to introduce an external air through the air inlet into the inner space of the housing and discharge an exhaust air from the inner space through the air outlet to an outside of the housing, the cooling unit comprising:

a case having a bottom unit and a front wall formed at a front side of the bottom unit;

a case handle formed at a front side of the front wall;

a cooling fan disposed at one side of an upper surface of the bottom unit so as to form a flow of the external air into the inner space; and a terminal protruding rearwards from a rear surface of the case to be electrically connectable to a power source inside the housing, wherein the cooling unit is coupled to the support plate to enter and exit the inner space;

a coupling unit for guiding the bottom unit to slide forward and backward on an upper surface of the support plate; and a movement adjusting unit for adjusting a sliding motion of the bottom unit, wherein the movement adjusting unit comprises:

a first bracket disposed at one side of the front wall of the bottom unit, a rotating shaft coupled to the first bracket so as to be rotatably disposed in a forward and backward direction and having a screw thread formed on an outer circumferential surface thereof, a screw rack disposed on the upper surface of the support plate so as to couple to a lower side of the screw thread, and a detachable handle detachably coupled to the front side of the bottom unit to rotate the rotating shaft, wherein an opening is formed through the bottom unit, one side of the screw thread of the rotating shaft protrudes below the bottom unit through the opening and is coupled to the screw rack, and wherein the terminal is electrically connected to the power source inside the housing when the screw rack is positioned at a front end of the screw thread by rotating the detachable handle in one direction, and the terminal is separated from the power source when the screw rack is disengaged from a rear end of the screw thread by rotating the detachable handle in an opposite direction.

2. The switchboard of claim 1, wherein the coupling unit comprises:

at least one slide fixed to a lower surface of the bottom unit of the case; and at least one guide disposed on the upper surface of the support plate and including a lift limiting unit for guiding the at least one slide forward and backward and restricting a rising of the at least one slide.

3. The switchboard of claim 2, wherein the coupling unit further comprises:

a stopper formed at a rear side of the at least one guide so as to prevent the at least one slide from deviating backward.

4. The switchboard of claim 1, further comprising:

a state displaying unit for displaying a position of the bottom unit;

wherein the state displaying unit comprises:

a first gear disposed at a front side of the rotating shaft;

a second bracket disposed at a front side of the first bracket; and a second gear coupled to the second bracket so as to engage with the first gear and rotate, wherein on a front side of the second gear, a first region disposed on an upper side of the second gear in a state in which the bottom unit is disposed inside the housing and a second region disposed on the upper side of the second gear in a state in which the bottom unit protrudes forward by the screw thread is provided.

5. The switchboard of claim 4, wherein the front wall of the case comprises: a transparent unit for checking the first region or the second region through the front wall.

6. The switchboard of claim 1, wherein the cooling unit further comprises:

a temperature sensor fixed to the bottom unit so as to be disposed near the heat source; and a controller for controlling an output of the cooling fan depending on a temperature measured by the temperature sensor.

7. The switchboard of claim 6, wherein the controller is configured to:

operate the cooling fan in a low output mode when the temperature measured by the temperature sensor is higher than or equal to a first temperature and less than a second temperature, operate the cooling fan in a medium output mode when the temperature measured by the temperature sensor is higher than or equal to the second temperature and less than a third temperature, and operate the cooling fan in a maximum output mode when the temperature measured by the temperature sensor is higher than or equal to the third temperature.

8. The switchboard of claim 7, wherein the first temperature, the second temperature, and the third temperature are 70 degrees Celsius, 80 degrees Celsius and 100 degrees Celsius, respectively, wherein in the low output mode, the controller operates the cooling fan at 60% of a maximum output of the cooling fan, in the medium output mode, the controller operates the cooling fan at 80% of the maximum output of the cooling fan, and in the maximum output mode, the controller operates the cooling fan at the maximum output.

9. The switchboard of claim 1, wherein the heat source is a power breaker.

* * * * *